United States Patent
Warner et al.

(10) Patent No.: US 7,617,899 B1
(45) Date of Patent: Nov. 17, 2009

(54) SHIFTING GEAR SYSTEM AND METHOD

(75) Inventors: Ty Warner, Warroad, MN (US); Todd Zinda, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 844 days.

(21) Appl. No.: 11/027,345

(22) Filed: Dec. 28, 2004

(51) Int. Cl.
*B62M 27/02* (2006.01)
*F16H 9/00* (2006.01)
*F16H 57/02* (2006.01)

(52) U.S. Cl. .................. 180/190; 180/9.62; 180/9.64; 74/606 R; 74/321; 74/325; 474/70; 474/73; 474/144; 474/148; 474/14; 474/21

(58) Field of Classification Search .......... 474/70, 474/73, 144, 148, 14, 21; 180/190, 9.62, 180/9.64; 74/606 R, 321, 325
See application file for complete search history.

(56) References Cited

U.S. PATENT DOCUMENTS

| | | | |
|---|---|---|---|
| 1,736,627 A | 11/1929 | Ryalls | |
| 3,603,166 A | 9/1971 | Holtan | |
| 4,425,814 A | 1/1984 | Dick | |
| 4,449,416 A | 5/1984 | Huitema et al. | |
| 4,498,350 A | 2/1985 | Ross | |
| 4,529,080 A | 7/1985 | Dolan | |
| 4,763,538 A * | 8/1988 | Fujita et al. | 74/6 |
| 5,021,031 A * | 6/1991 | Hibi | 474/18 |
| 5,068,583 A | 11/1991 | Gresham et al. | |
| 5,460,060 A | 10/1995 | Nellums | |
| 5,526,889 A | 6/1996 | Neary | |
| 5,689,997 A | 11/1997 | Schaller | |
| 5,857,385 A | 1/1999 | Takeuchi | |
| 5,878,624 A | 3/1999 | Showalter et al. | |
| 6,186,263 B1 | 2/2001 | Takaro | |
| 6,619,153 B2 | 9/2003 | Smith et al. | |
| 6,637,283 B2 | 10/2003 | Belloso | |
| 6,694,836 B2 | 2/2004 | Kawamoto et al. | |
| 6,708,579 B2 * | 3/2004 | Punko | 74/425 |
| 6,742,618 B2 * | 6/2004 | Schoenfelder et al. | 180/182 |
| 6,896,087 B2 * | 5/2005 | Korenjak et al. | 180/292 |
| 6,907,951 B2 * | 6/2005 | Schoenfelder | 180/190 |
| 7,063,639 B2 * | 6/2006 | Schoenfelder et al. | 475/286 |

* cited by examiner

*Primary Examiner*—Paul N Dickson
*Assistant Examiner*—Marlon A Arce
(74) *Attorney, Agent, or Firm*—Baker & Daniels LLP

(57) ABSTRACT

Embodiments of the invention facilitate shifting by reducing forces on certain shifting components and includes a snowmobile comprising a chassis, an engine supported by the chassis, a drive train operatively connected to the engine, the drive train comprising a reverse sprocket assembly functionally coupled to an upper sprocket assembly, a jackshaft rotatable within the upper sprocket assembly, and a pinion operatively connected to the jackshaft and selectively positionable axially along the jackshaft to a first position that engages the upper sprocket assembly to translate the snowmobile in a forward direction or to a second position that engages the reverse sprocket assembly to translate the snowmobile in a reverse direction.

42 Claims, 11 Drawing Sheets

SHIFTING GEAR SYSTEM AND METHOD

FIELD OF THE INVENTION

This disclosure relates to the field of gear systems, and, more particularly, to a snowmobile with an improved shifting gear system.

BACKGROUND OF THE INVENTION

Straddle seat type vehicles, such as snowmobiles, are operated on a wide variety of terrain. Much of this terrain is frequently not level, with the vehicle being operated on an incline or a decline. During use, large forces are transmitted through a ground engaging element, such as a drive track, through a drive train to a braking system. In a traditional gearing system, these forces are transmitted through the drive train in a way that puts large binding forces on components used for shifting the vehicle between a forward direction and a reverse direction.

These binding forces make it difficult for users to shift the gears between forward and reverse, particularly when the vehicle is at an incline or decline.

BRIEF SUMMARY OF THE INVENTION

The various embodiments of the invention facilitate shifting by reducing binding forces on certain shifting components. The reduction of binding forces decreases the amount of force required to complete a shift. In some embodiments, the invention includes a snowmobile comprising a chassis, an engine supported by the chassis, and a drive train operatively connected to the engine. The drive train may comprise a reverse sprocket assembly functionally coupled to an upper sprocket assembly, a jackshaft freely rotatable within the upper sprocket assembly, and a pinion operatively connected to the jackshaft. The pinion may be selectively positionable axially along the jackshaft to a first position that engages the upper sprocket assembly to translate the snowmobile in a forward direction or to a second position that engages the reverse sprocket assembly to translate the snowmobile in a reverse direction. Such a system may substantially isolate the shifting components from binding forces produced between the drive track and braking assembly, thereby allowing for easier shifting between forward and reverse positions. Embodiments of the invention also include a method of shifting between forward and reverse directions.

BRIEF DESCRIPTION OF THE DRAWINGS

FIG. 9(*b*) shows a perspective view of a shifting assembly in accordance with an embodiment of the invention.

FIG. 9(*c*) shows a perspective view of a shifting assembly in accordance with an embodiment of the invention.

DETAILED DESCRIPTION OF THE PREFERRED EMBODIMENTS OF THE INVENTION

The following detailed description should be read with reference to the drawings, in which like elements in different drawings are numbered identically. The drawings, which are not necessarily drawn to scale, depict selected embodiments of the invention and are not intended to limit the scope of the invention. Several forms of the embodiments will be shown and described, and other forms will be apparent to those skilled in the art. It will be understood that embodiments shown in drawings and described are merely for illustrative purposes and are not intended to limit the scope of the embodiments as defined in the claims that follow.

Figure 1:
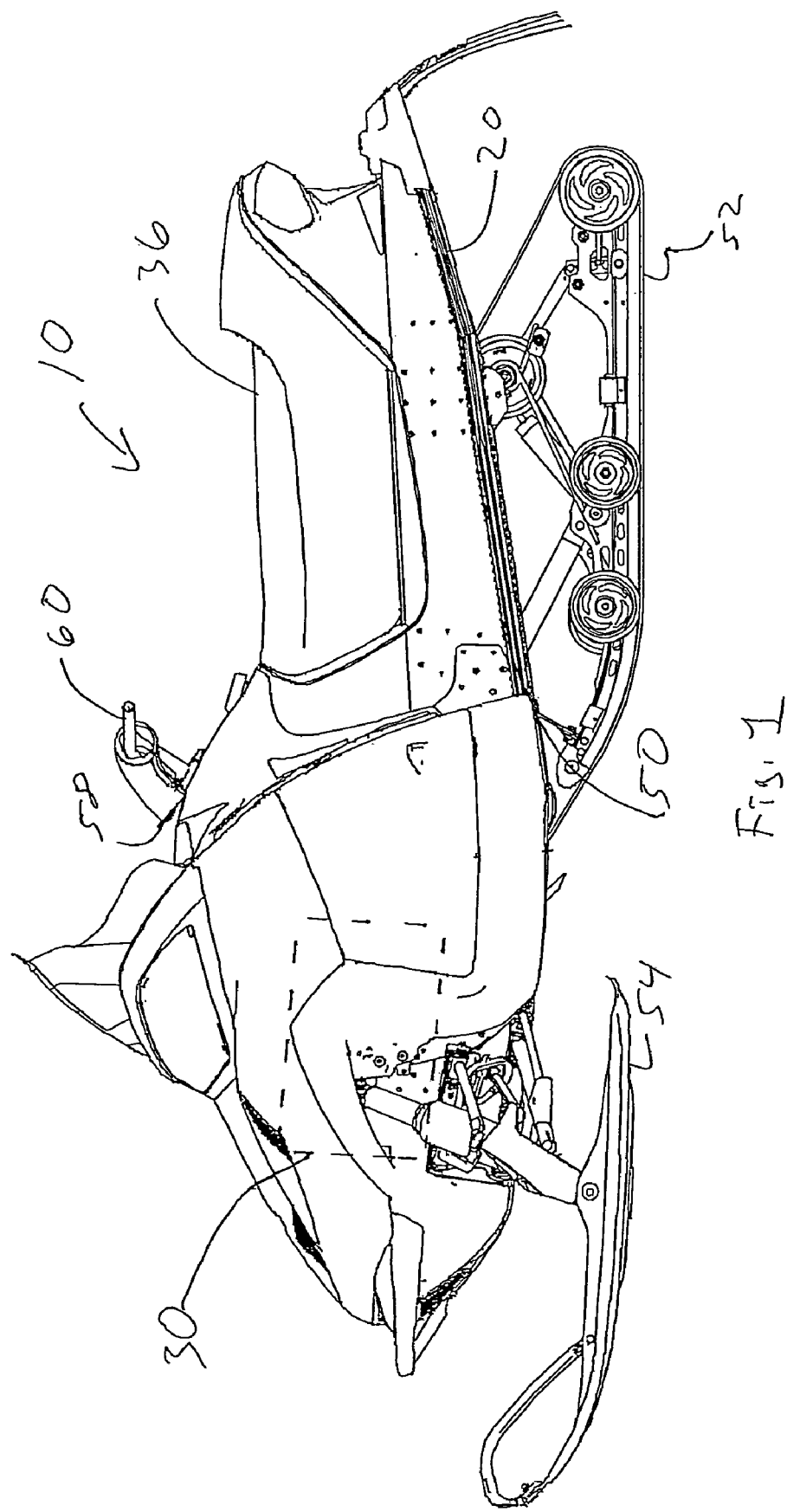
FIG. 1 shows a side plan view of a snowmobile in accordance with an embodiment of the invention.

A snowmobile 10 in accordance with an embodiment of the invention is shown in FIG. 1. Generally, snowmobile 10 includes a longitudinally extending chassis 20. The chassis 20 supports and mounts several vehicle components, including an engine 30, a straddle type seat 36, footrests 50, at least one ground engaging element, such as a drive track 52, and a pair of steerable skis 54. The seat 36 is adapted to accommodate a rider in straddle fashion, and the engine 30 powers the drive track 52 to propel the snowmobile 10. A steering post 58 is operatively connected to the pair of skis 54, and handlebars 60 to effect steering may be provided.

Figure 2:
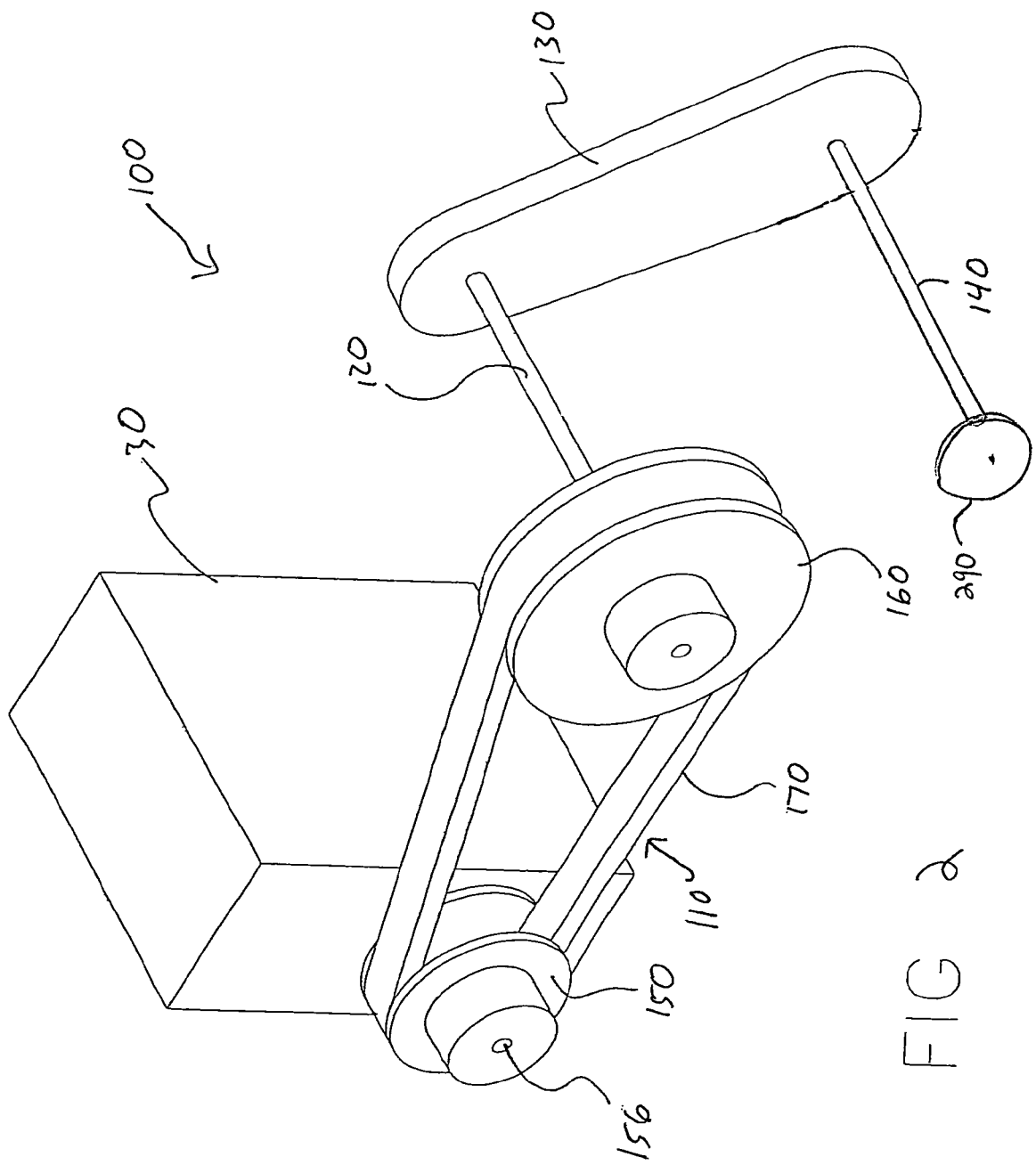
FIG. 2 shows a schematic, perspective view of a drive train in accordance with an embodiment of the invention.

An engine 30 and drive train 100 are shown schematically in FIG. 2. The engine 30 delivers power through the drive train 100 to the drive track 52. Generally, the drive train 100 comprises a transmission 110, jackshaft 120, gear case 130 and a drive shaft 140. The transmission 110 may be any device useful for transferring power from the engine 30 to the jackshaft 120. In the embodiment shown in FIG. 2, the transmission 110 comprises a continuously variable transmission (CVT) having a drive clutch 150 coupled to a crankshaft 156 and a driven clutch 160 coupled to the drive clutch 150 by a belt 170. Driven clutch 160 is coupled to jackshaft 120, which transmits rotational movement into gear case 130. As discussed below, gear case 130 may comprise one or more gears useful for translating the snowmobile 10 in a forward or a reverse direction. Drive shaft 140 is coupled to the gear case 130 and drives drive track 52 to propel the snowmobile 10 in either a forward or reverse direction. While the transmission is shown as a CVT, it may comprise any style or type of transmission system.

Figure 3:
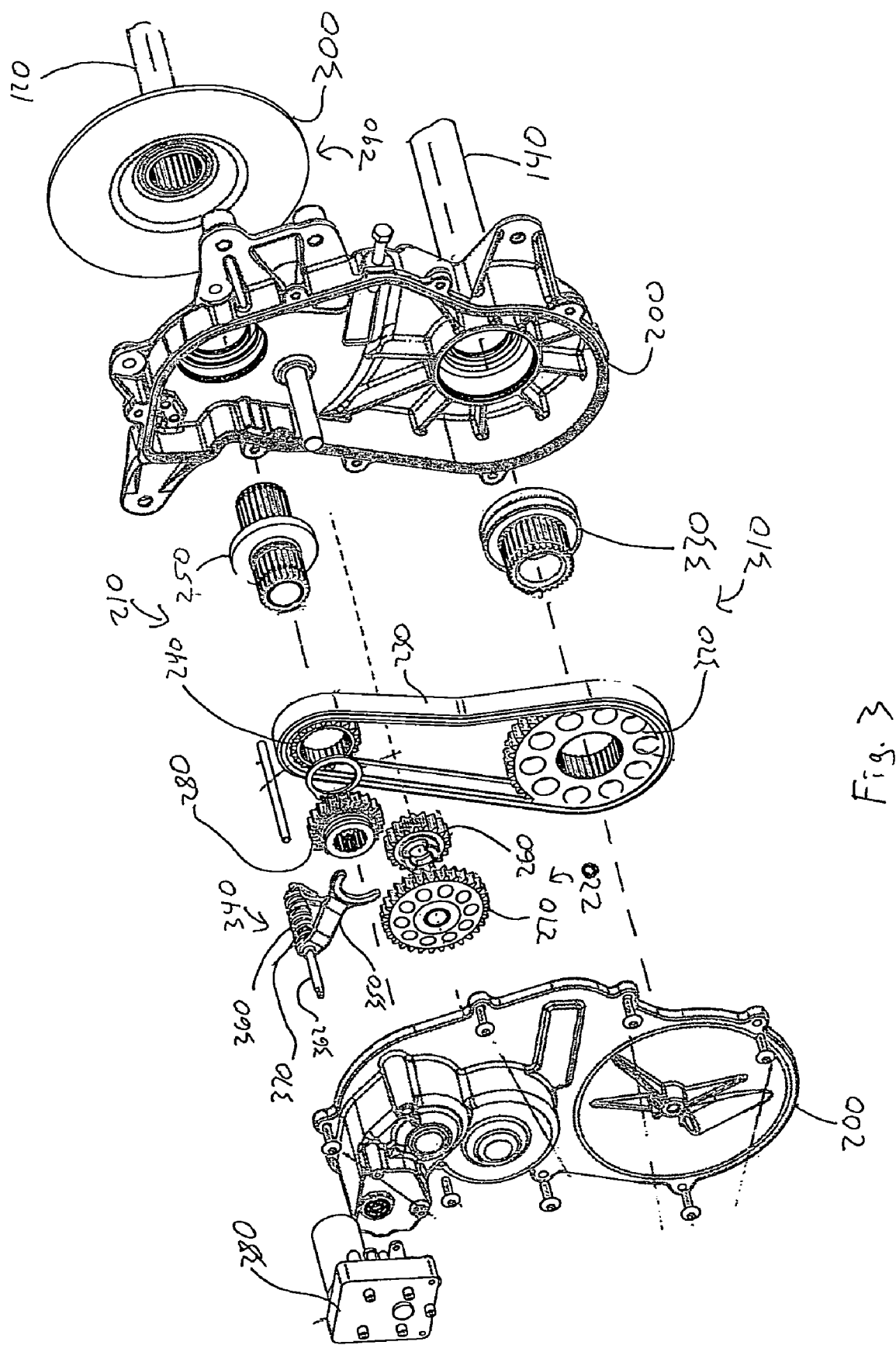
FIG. 3 shows an exploded perspective view of a gear case in accordance with an embodiment of the invention.
Figure 4:
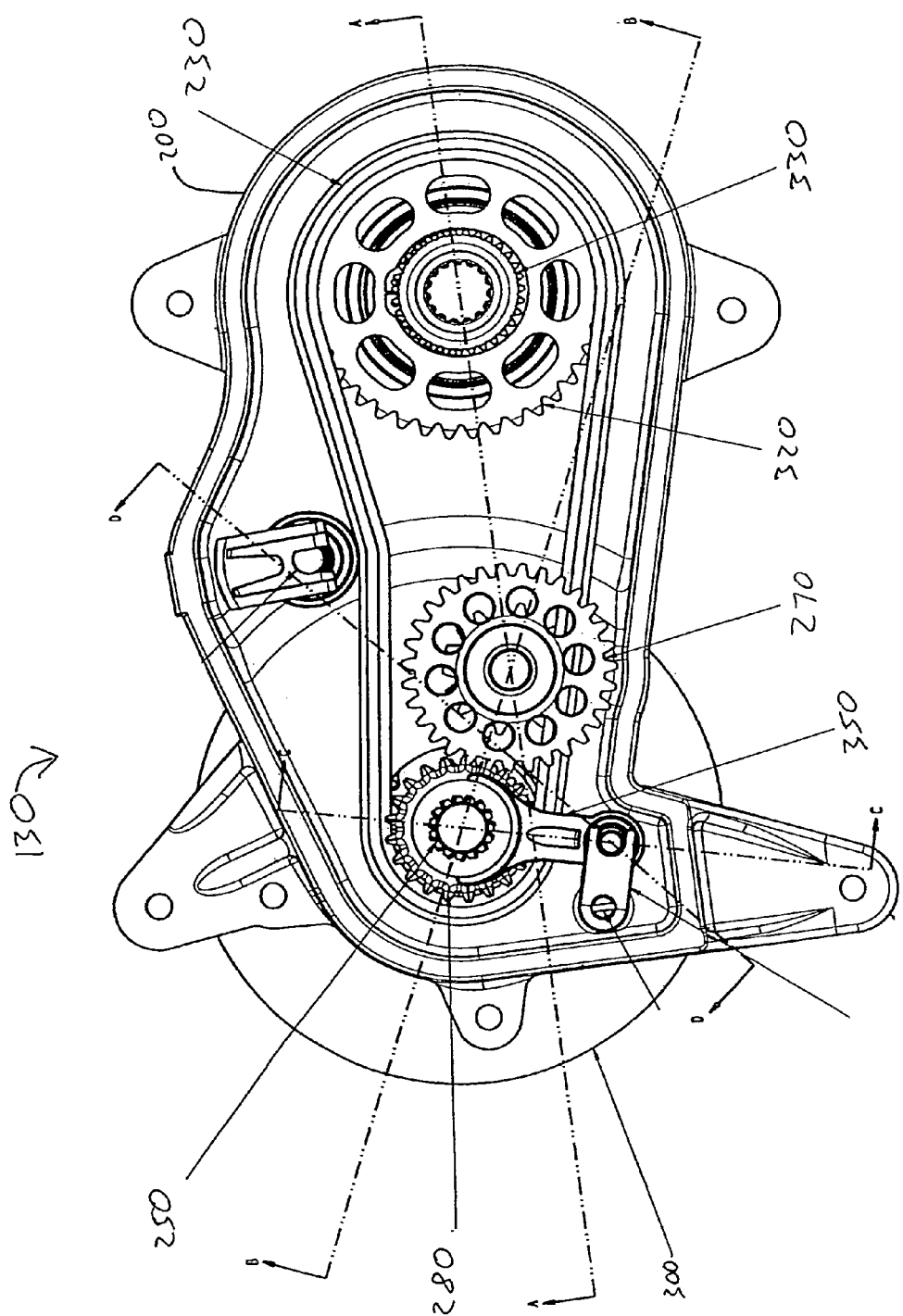
FIG. 4 shows a side plan view of a gear case in accordance with an embodiment of the invention.

FIG. 3 shows an exploded perspective view of gear case 130 in accordance with an embodiment of the invention. As shown in FIGS. 3 and 4, the gear case 130 generally includes one or more housing elements 200 useful for housing in whole or in part the various components described herein. In some embodiments, the gear case 130 may house an upper sprocket assembly 210, a reverse sprocket assembly 220, and a lower sprocket assembly 310. Upper sprocket assembly 210, reverse sprocket assembly 220, and lower sprocket assembly 310 may be functionally coupled by any suitable means, including direct engagement. In some embodiments, a chain 230 functionally couples the upper sprocket assembly 210, lower sprocket assembly 310, and reverse sprocket assembly 220. The chain 230 may be any element useful in performing this function. As will be described in detail hereinafter, the operative coupling of the upper sprocket assembly 210 and lower sprocket assembly 310 effectively couples jackshaft 120 to drive shaft 140. While the jackshaft 120 rotates in one direction, the direction of rotation of the drive shaft 140 will depend on whether the reverse sprocket assembly 220 is engaged or not as will be described in detail hereinafter.

In some embodiments, jackshaft 120 is freely rotatable within the upper sprocket assembly 210. Such an embodiment allows jackshaft 210 to be substantially isolated from forces experienced by the upper sprocket assembly 210. The upper sprocket assembly 210 may comprise any device or feature useful for transferring force. In the embodiment shown in FIGS. 3-8, the upper sprocket assembly 210 includes an upper sprocket 240 and an upper hub 250. The upper sprocket 240 and upper hub 250 may be connected by any suitable means (e.g., key, tooth, dog and/or spline interface or engagement). The upper hub 250 is useful for receiving or transferring forces as described below, and the upper sprocket 240 is useful for receiving forces from, or transferring forces to, chain 230.

The reverse sprocket assembly 220 may comprise any device or feature useful for reversing the direction of chain 230 and thereby the direction of the snowmobile 10. As shown in FIGS. 3-8 and 10, the reverse sprocket assembly 220 may include a reverse sprocket 260 and a reverse gear 270. The reverse sprocket 260 and the reverse gear 270 may be connected by any suitable means (e.g., key, tooth, dog and/or spline interface or engagement). The reverse gear 270 is useful for receiving force inputs as described below, and the reverse sprocket 260 is useful for transferring those forces to chain 230.

Figure 5:
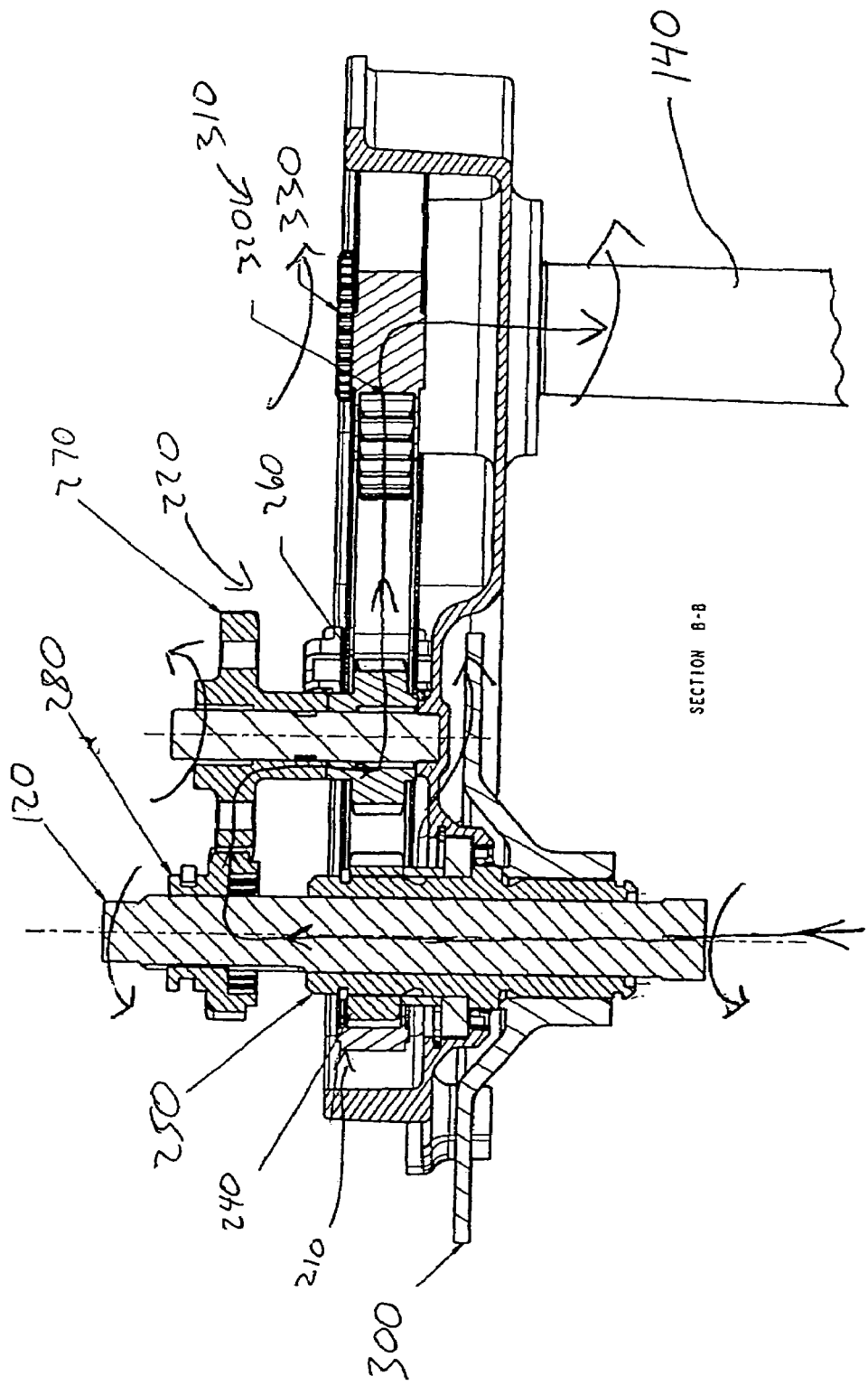
FIG. 5 shows a cross-section view of the gear case of FIG. 4 taken along line B-B configured to translate a vehicle in a reverse direction.
Figure 6:
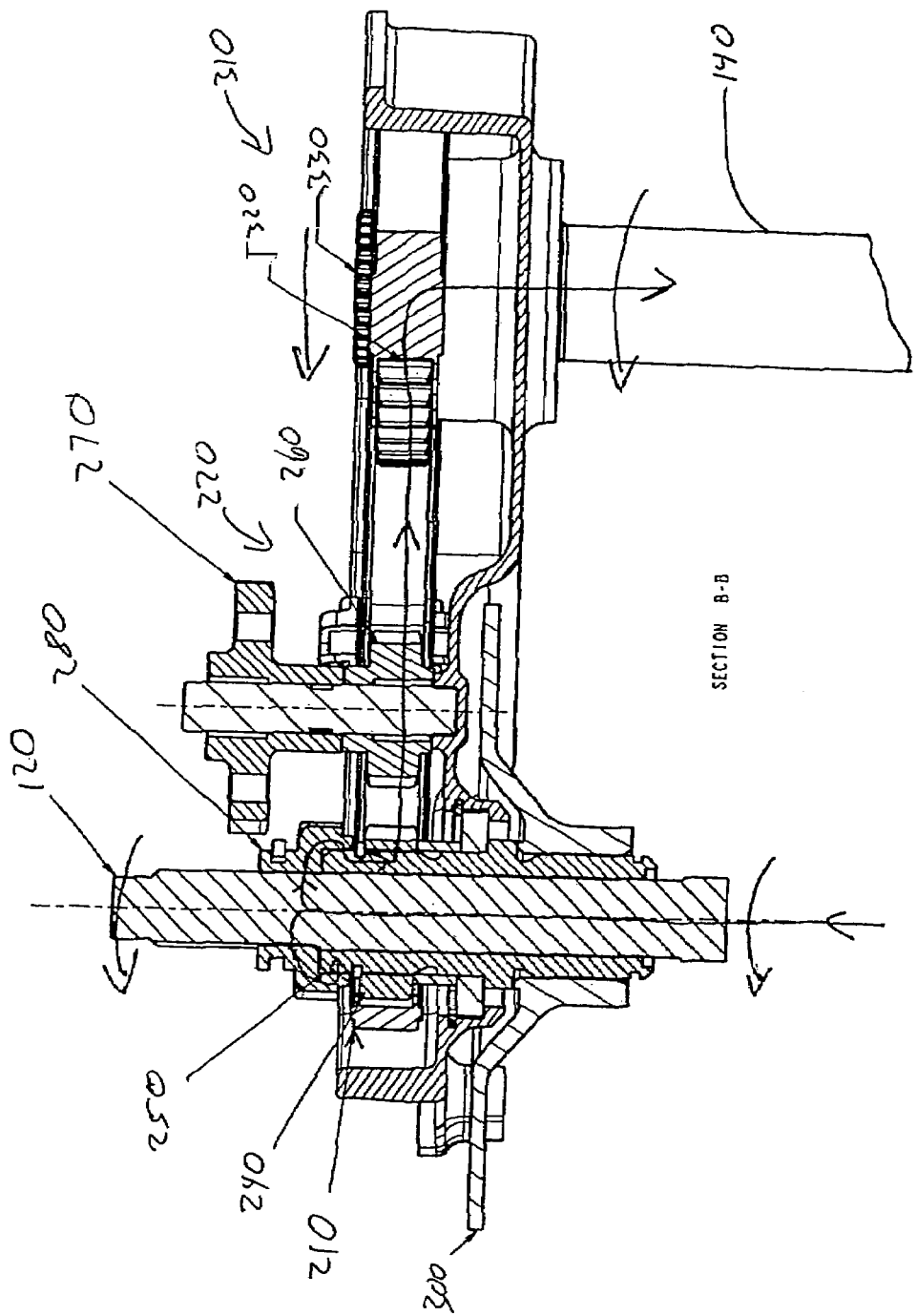
FIG. 6 shows a cross-section view of the gear case of FIG. 4 taken along line B-B configured to translate a vehicle in a forward direction.
Figure 7:
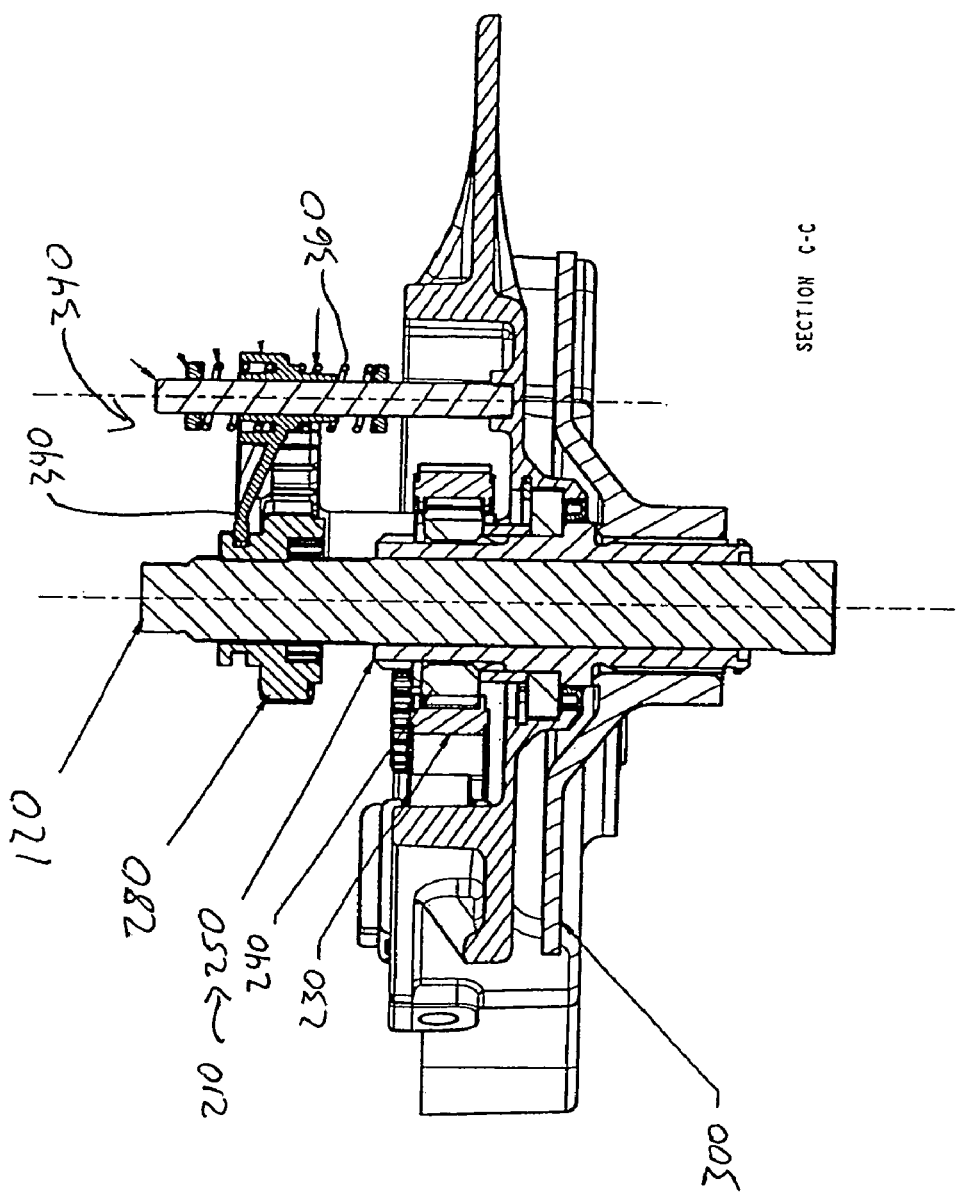
FIG. 7 shows a cross-section view of the gear case of FIG. 4 taken along line C-C.
Figure 8:
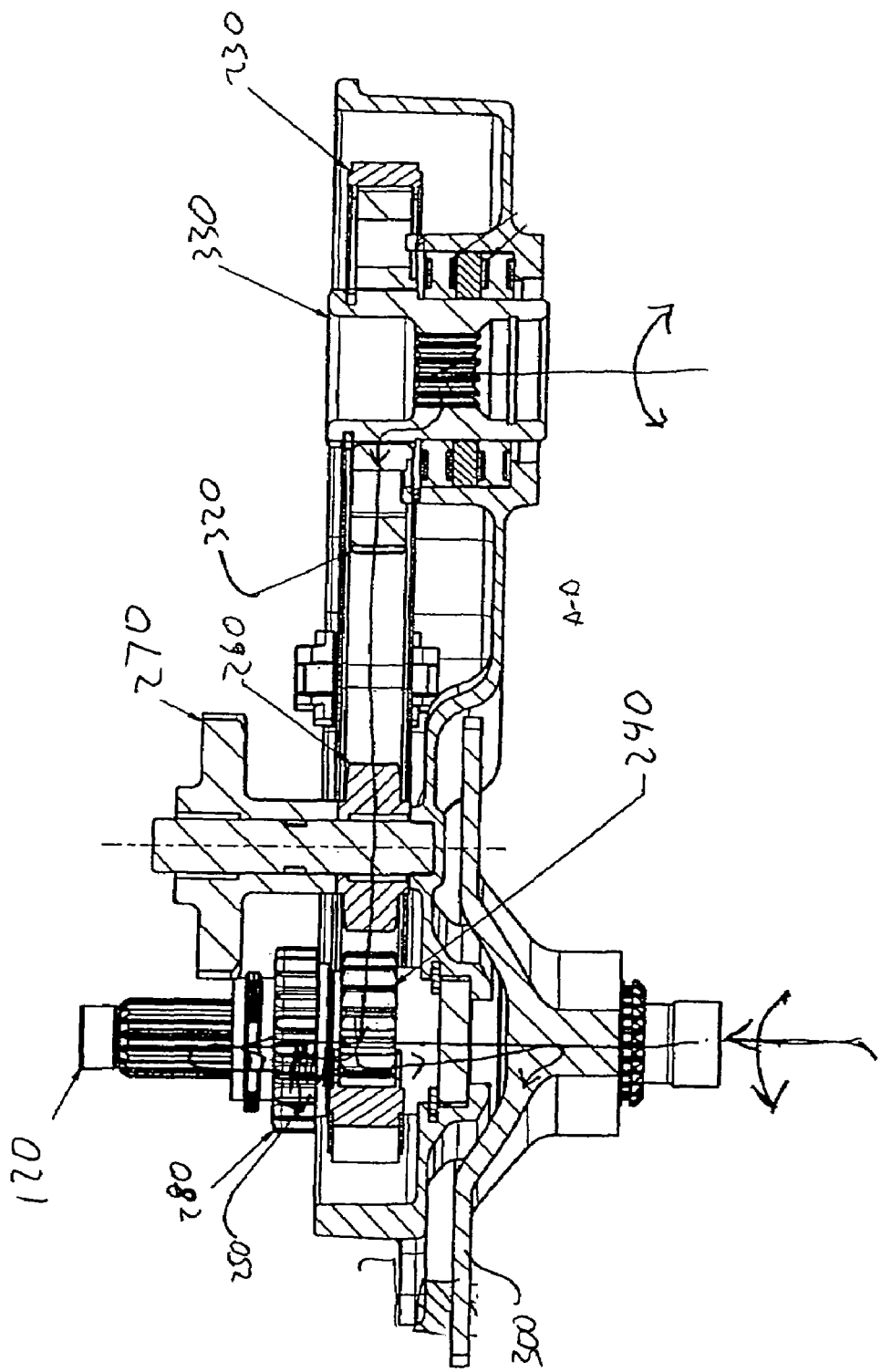
FIG. 8 shows a cross-section view of the gear case of FIG. 4 taken along line D-D.

A pinion 280 operatively connected to the jackshaft 120 may be provided. Pinion 280 may comprise any member useful for selectively engaging the upper sprocket assembly 210 to translate the snowmobile 10 in a forward direction as shown in FIG. 6, or engage the reverse sprocket assembly 220 to translate the snowmobile 10 in a reverse direction, as shown in FIG. 5.

The pinion 280 may be operatively connected to or engage the jackshaft 120, upper sprocket assembly 210, reverse sprocket assembly 220 and/or other components in any suitable fashion. In the embodiment shown in FIGS. 3-8, the pinion 280 and the jackshaft 120 are operatively connected by a spline interface that allows pinion 280 to travel axially along jackshaft 120, but holds it against rotational movement relative to jackshaft 120. In such an embodiment, the pinion 280 may be selectively positioned axially along the jackshaft 120 to a first position that engages the upper sprocket assembly 210, or to a second position that engages the reverse sprocket assembly 220. When the pinion 280 and the upper sprocket assembly 210 are in apposition, they may engage each other by any suitable means (e.g., a spline interface). When the pinion 280 and the reverse sprocket assembly 220 are in apposition, they may also engage each other by any suitable means (e.g., by tooth engagement).

The snowmobile 10 may further include a braking assembly 290 functionally coupled to the drive train 100. As shown in FIG. 3, the braking assembly may be functionally coupled to the upper sprocket assembly 210. In some embodiments, the braking assembly 290 includes a rotor 300 functionally coupled to the upper hub 250 and a caliper (not shown) to engage the rotor 300 to slow the snowmobile 10 or hold its position on an incline or a decline. In embodiments where the rotor 300 is coupled to the upper hub 250, and the upper hub 250 freely rotates over jackshaft 120, the jackshaft 120 is substantially isolated from binding forces present between the drive track 52 and the rotor 300 during shifting. In other embodiments, the braking assembly is functionally coupled to the drive shaft 140 (as shown in FIG. 2).

As shown in FIG. 3, the snowmobile 10 may further include a lower sprocket assembly 310 engaging the chain 230 and functionally coupled to a drive shaft 140. As shown in the embodiments of FIGS. 3-8, the lower sprocket assembly 310 may include a lower sprocket 320 and a lower hub 330. The lower sprocket 320 and lower hub 330 may be connected by any suitable means (e.g., key, tooth, dog and/or spline interface or engagement).

Figure 9:
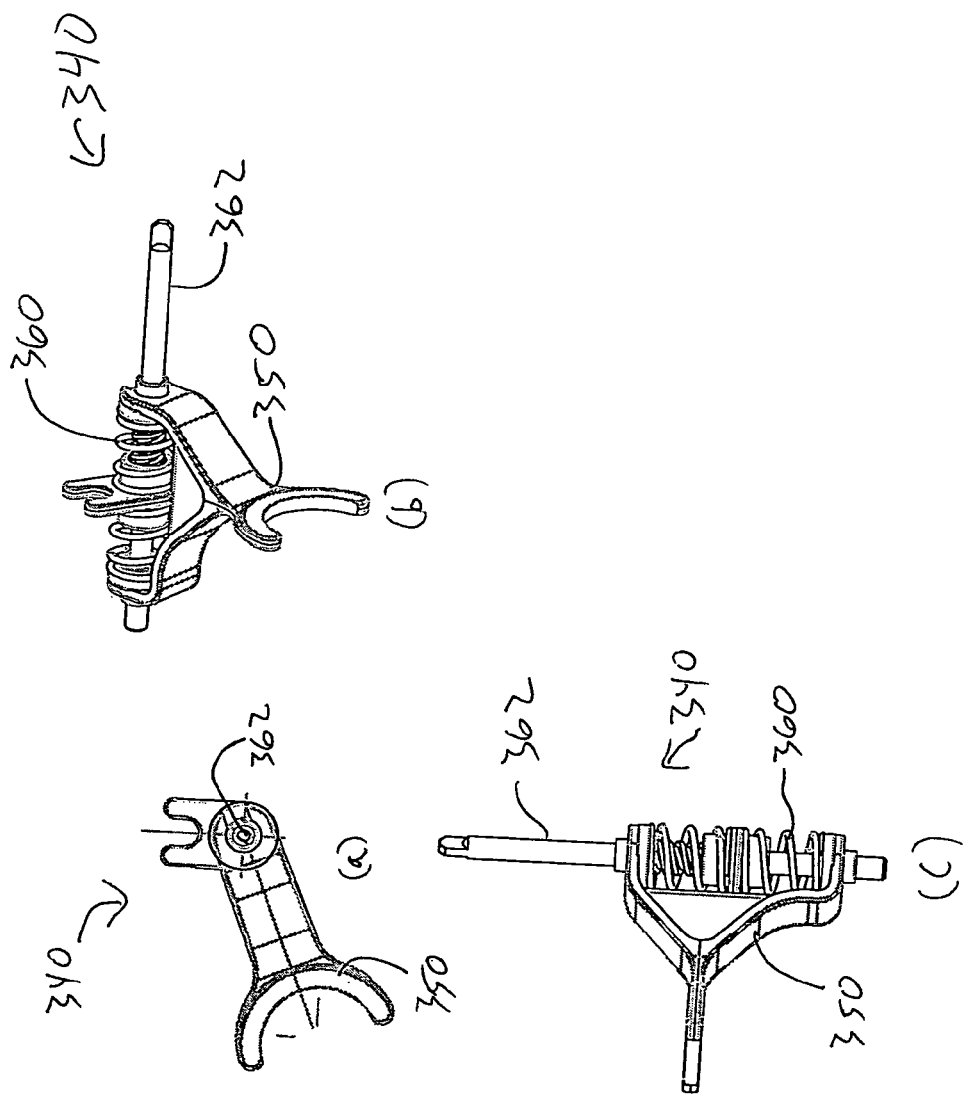
FIG. 9(*a*) shows a side plan view of a shifting assembly in accordance with an embodiment of the invention.
Figure 10:
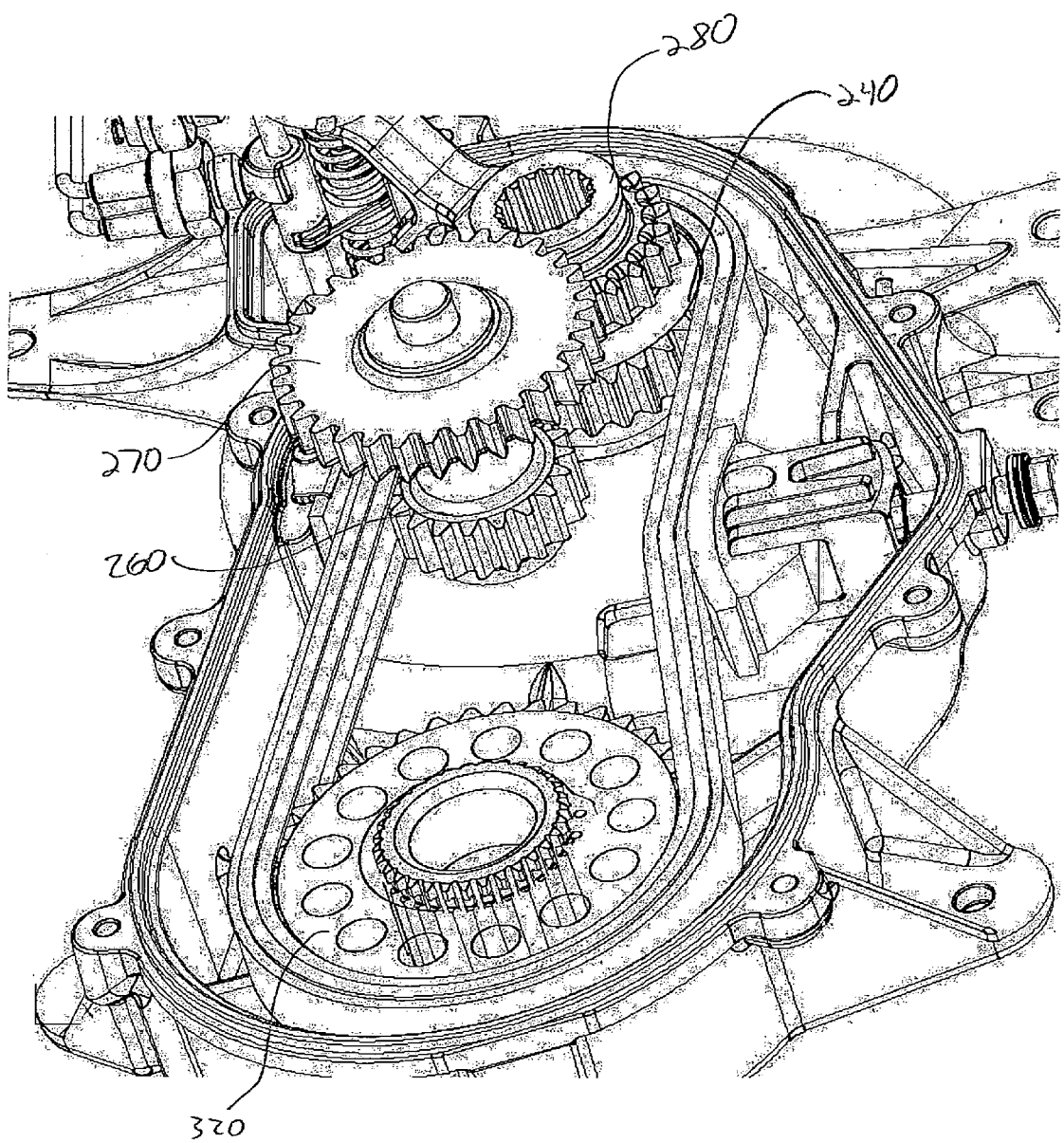
FIG. 10 shows an enlarged perspective view of a portion of a gear case in accordance with an embodiment of the invention.
Figure 11:
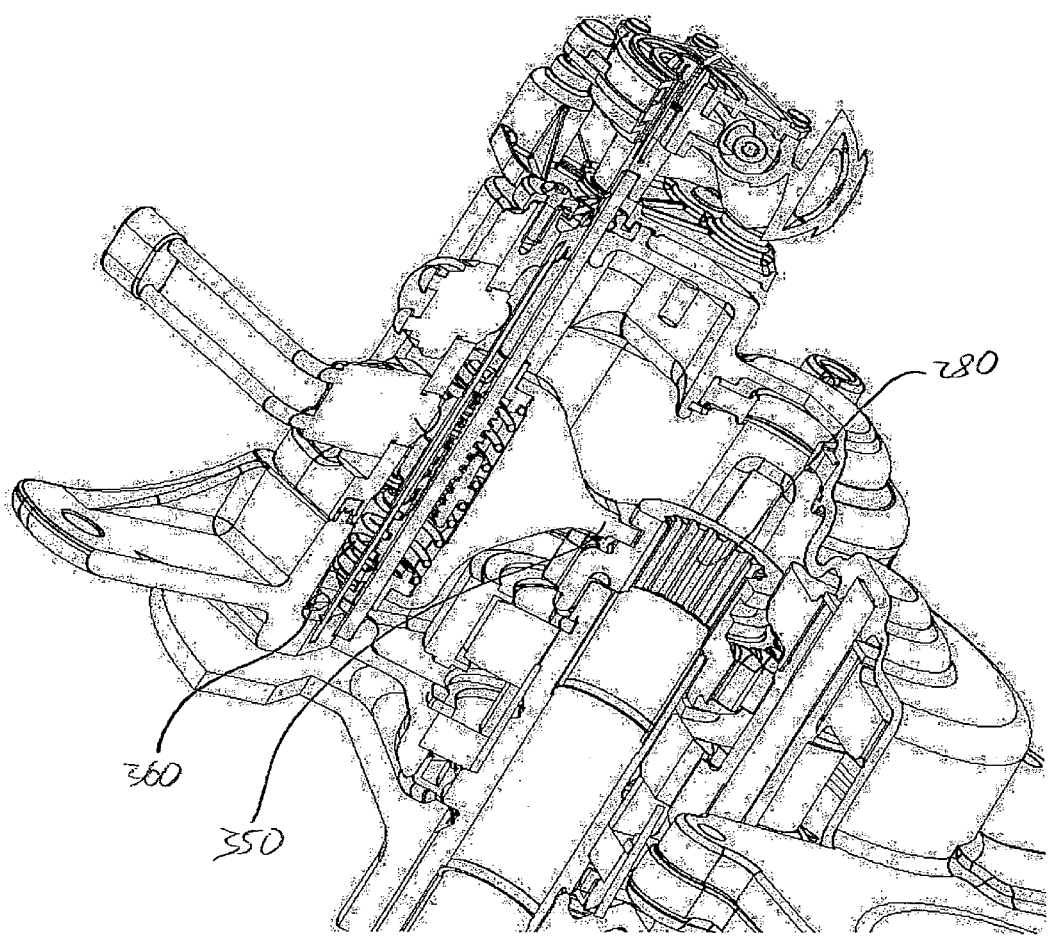
FIG. 11 shows an enlarged perspective view of a portion of a gear case in accordance with an embodiment of the invention.

The snowmobile 10 may further include a shifting assembly 340 to selectively position the pinion 280 axially along the jackshaft 120, as best shown in FIGS. 3, 9 and 11. In some embodiments, the shifting assembly 340 includes a shifting member 350 biased by at least one spring 360 carried on a shifting shaft 362, a lead screw 370, and a rotary actuator 380.

The shifting member 350 may comprise any shape useful for engaging the pinion 280 (e.g.) a fork shape adapted to engage the pinion 280 about its circumference). The spring 360 is useful for reducing wear on the pinion 280 during shifting. When the pinion 280 is properly aligned with either the upper sprocket assembly 210 or the reverse sprocket assembly 220, the spring 360 will force the pinion 280 into engagement to complete the shifting process. The rotary actuator 380 is useful for rotating shifting shaft 362 relative to lead screw 370 to move shifting member 350 axially along shifting shaft 362. The rotary actuator 380 may be driven by any suitable method, such as manually or by a motor (e.g., an electric motor). When driven by a motor, a switch may be provided for a user to activate the motor to shift between forward and reverse directions.

Such a system as described above is useful for isolating forces from the jackshaft 120 during shifting, thereby permitting easier shifting between forward and reverse directions. In some embodiments, the jackshaft 120 is substantially isolated from forces existing between the drive track 52 and the braking system 290. These forces may be substantial, and generally increase as the angle of inclination of the snowmobile 10 increases (e.g., when traversing hilly terrain). The reduction of the binding forces and the design of the shifting assembly 340 further allow the shifting process to be driven by a motor, such as an electric motor.

In some embodiments, reduction in forces on the jackshaft may be large as a result of the embodiments of the invention, substantially regardless of the incline and the combined weight of the machine and rider. For example, the upper sprocket assembly 210 to jackshaft 120 torque may be less than about ten foot-pounds and could be less than about six foot-pounds when the snowmobile 10 is at an incline between about ten and about fifty degrees and the combined weight of the snowmobile 10 and a rider is between about five-hundred and about seven-hundred-and-fifty pounds. Such a reduction in forces allows for easier shifting between forward and reverse.

Various embodiments of the invention also include a method of shifting a snowmobile 10 as described above. In some embodiments, the method includes selectively positioning the pinion 280 axially along the jackshaft 120 to a first position that engages the upper sprocket assembly 210 to translate the snowmobile 10 in a forward direction, or to a second position that engages the reverse sprocket assembly 220 to translate the snowmobile 10 in a reverse direction. The pinion 280 may be selectively positioned axially along the jackshaft 120 by actuating shifting assembly 340, which may be motor driven as described above. The method may also include the step of applying a brake functionally coupled to the upper sprocket assembly 210, wherein forces between the drive shaft 140 and the brake do not substantially impinge on the jackshaft 120 during shifting. The invention also includes a method of reducing forces on jackshaft 120 when the snowmobile 10 is shifted as described above.

In the embodiment of FIG. 5, when the snowmobile 10 is configured to be translated in a reverse direction, the jackshaft 120 transmits force to the pinion 280 by a spline interface, the pinion 280 transfers the force to the reverse gear 270 by tooth engagement, the reverse gear 270 transmits the force to the reverse sprocket 260 by mechanical interface, the reverse sprocket 260 transmits the force to the chain 230, and the chain 230 transmits the force to the upper sprocket 240 and the lower sprocket 320. In such embodiments, the upper sprocket 240 transmits the force to the upper hub 250, which rotates over the jackshaft 120, and the lower sprocket 320 transmits the force to the lower hub 330, which transmits the force to the drive shaft 140 to translate the snowmobile 10 in a reverse direction.

In the embodiment of FIG. 6, when the snowmobile 10 is configured to be translated in a forward direction, the jackshaft 120 transmits force to the pinion 280 by a spline interface, the pinion 280 transmits force to the upper hub 250 by spline engagement, the upper hub 250 transmits force to the upper sprocket 240 by spline engagement, the upper sprocket 240 transmits force to the chain 230, the chain 230 transmits force to the lower sprocket 320, the lower sprocket 320 transmits force to the lower hub 330 by direct spline interface, and the lower hub 330 transmits the force to the drive shaft 140 to translate the snowmobile 10 in a forward direction.

Thus, in the embodiments described above, the jackshaft 120 is substantially isolated from binding forces in the system during shifting. In such a system, less force is required to shift between forward and reverse, especially on an incline or a decline where forces are particularly large.

The following example is presented for illustrative purposes only and is not intended to limit the scope of the claims that follow.

Example 1

In this example, a computer simulation was run to determine the force load applied to the jackshaft in a traditional gear case and an embodiment of the invention for a relatively heavy system. The test parameters for a relatively heavy system are shown in Table 1, the results for a traditional system are shown in Table 2, and the results for an embodiment of the invention are shown in Table 3.

TABLE 1

Test Parameters

| | |
|---|---|
| Weight of Machine and Rider | 750 lbs |
| Efficiency of Track | 0.57 |
| Diameter of Drive Sprocket | 0.6525 ft |
| Diameter of Lower Sprocket | 0.427725 ft |
| Diameter of Upper Sprocket | 0.24868 ft |

TABLE 2

Forces from an Inclined Slope in Traditional Gear Case

| Incline of Plane in Degrees | Lbs Track Force | Ft-lbs Drive Sprocket Torque | Lbs Chain Force | Ft-lbs Upper Sprocket to Jackshaft Torque |
|---|---|---|---|---|
| 10 | 74.23 | 24.22 | 113.25 | 14.08 |
| 20 | 146.21 | 47.70 | 223.05 | 27.73 |
| 30 | 213.75 | 69.74 | 326.08 | 40.54 |
| 40 | 274.79 | 89.65 | 419.20 | 52.12 |
| 50 | 327.48 | 106.84 | 499.58 | 62.12 |

TABLE 3

Forces from an Inclined Slope in an Embodiment of the Invention

| Incline of Plane in Degrees | Lbs Track Force | Ft-lbs Drive Sprocket Torque | Lbs Chain Force | Ft-lbs Upper Sprocket to Jackshaft Torque |
|---|---|---|---|---|
| 10 | 74.23 | 24.22 | 113.25 | 6.00 |
| 20 | 146.21 | 47.70 | 223.05 | 6.00 |
| 30 | 213.75 | 69.74 | 326.08 | 6.00 |
| 40 | 274.79 | 89.65 | 419.20 | 6.00 |
| 50 | 327.48 | 106.84 | 499.58 | 6.00 |

As shown in Example 1, some embodiments of the invention do not experience an appreciable increase in the force load applied to the jackshaft as the incline of the vehicle is increased. As can be seen in Table 2, in prior art designs binding forces increased by a factor of over four as the incline was increased from ten degrees to fifty degrees. Table 3 shows an embodiment of the invention substantially reduces binding forces on shifting components, thereby facilitating easier shifting.

Example 2

In this example, a computer simulation was run to determine the force load applied to the jackshaft in a traditional gear case and an embodiment of the invention for a relatively light system. The test parameters for a relatively light system are shown in Table 4, the results for a traditional system are shown in Table 5, and the results for an embodiment of the invention are shown in Table 6.

TABLE 4

Test Parameters

| | |
|---|---|
| Weight of Machine and Rider | 500 lbs |
| Efficiency of Track | 0.57 |
| Diameter of Drive Sprocket | 0.6525 ft |
| Diameter of Lower Sprocket | 0.427725 ft |
| Diameter of Upper Sprocket | 0.24868 ft |

TABLE 5

Forces from an Inclined Slope in Traditional Gear Case

| Incline of Plane in Degrees | Lbs Track Force | Ft-lbs Drive Sprocket Torque | Lbs Chain Force | Ft-lbs Upper Sprocket to Jackshaft Torque |
|---|---|---|---|---|
| 10 | 49.49 | 16.15 | 75.50 | 9.39 |
| 20 | 97.48 | 31.80 | 148.70 | 18.49 |
| 30 | 142.50 | 46.49 | 217.39 | 27.03 |
| 40 | 183.19 | 59.77 | 279.47 | 34.75 |
| 50 | 218.32 | 71.23 | 333.05 | 41.41 |

TABLE 6

Forces from an Inclined Slope in an Embodiment of the Invention

| Incline of Plane in Degrees | Lbs Track Force | Ft-lbs Drive Sprocket Torque | Lbs Chain Force | Ft-lbs Upper Sprocket to Jackshaft Torque |
|---|---|---|---|---|
| 10 | 49.49 | 16.15 | 75.50 | 6.00 |
| 20 | 97.48 | 31.80 | 148.70 | 6.00 |
| 30 | 142.50 | 46.49 | 217.39 | 6.00 |
| 40 | 183.19 | 59.77 | 279.47 | 6.00 |
| 50 | 218.32 | 71.23 | 333.05 | 6.00 |

As shown in Example 2, some embodiments of the invention do not experience an appreciable increase in the force load applied to the jackshaft as the incline of the vehicle is increased. As can be seen in Table 5, in prior art designs binding forces increased by a factor of over four as the incline was increased from ten degrees to fifty degrees. Table 6 shows an embodiment of the invention substantially reduces binding forces on shifting components, thereby facilitating easier shifting.

Thus, embodiments of the various gear systems and methods are disclosed. One skilled in the art will appreciate that the invention can be practiced with embodiments other than those disclosed. The disclosed embodiments are presented for purposes of illustration and not limitation, and the invention is limited only by the claims that follow.

What is claimed is:

1. A snowmobile comprising:
   a chassis;
   a drive train operatively connected to an engine supported by the chassis, the drive train comprising:
   an upper sprocket assembly;
   a reverse sprocket assembly functionally coupled to the upper sprocket assembly;
   a jackshaft rotatable within the upper sprocket assembly; and
   a pinion operatively connected to the jackshaft and selectively positionable axially along the jackshaft to a first position that engages the upper sprocket assembly to translate the snowmobile in a forward direction and to a second position that engages the reverse sprocket assembly to translate the snowmobile in a reverse direction.

2. The snowmobile of claim 1, wherein the reverse sprocket assembly and the upper sprocket assembly are functionally coupled by a chain.

3. The snowmobile of claim 1, further including a braking assembly functionally coupled to the drive train.

4. The snowmobile of claim 3, wherein the braking assembly is functionally coupled to the upper sprocket assembly.

5. The snowmobile of claim 4, wherein the braking assembly includes a rotor functionally coupled to the upper sprocket assembly.

6. The snowmobile of claim 2, further including a lower sprocket assembly engaging the chain and functionally coupled to a drive shaft.

7. The snowmobile of claim 6, further including a braking assembly functionally coupled to the drive shaft.

8. The snowmobile of claim 6, wherein the lower sprocket assembly includes a lower sprocket and a lower hub connected by a spline interface.

9. The snowmobile of claim 1, wherein the upper sprocket assembly includes an upper sprocket and an upper hub connected by a spline interface.

10. The snowmobile of claim 9, further including a braking assembly functionally coupled to the upper sprocket assembly, wherein the braking assembly includes a rotor functionally coupled to the upper hub.

11. The snowmobile of claim 1, wherein the reverse sprocket assembly includes a reverse sprocket and a reverse gear.

12. The snowmobile of claim 1, wherein the pinion and the jackshaft are operatively coupled by a spline interface.

13. The snowmobile of claim 1, wherein the pinion engages the upper sprocket assembly by a spline interface.

14. The snowmobile of claim 1, wherein the pinion engages the reverse sprocket assembly by tooth engagement.

15. The snowmobile of claim 1, further including a shifting assembly to selectively position the pinion axially along the jackshaft.

16. The snowmobile of claim 15, wherein the shifting assembly includes a spring biased shifting member.

17. The snowmobile of claim 16, wherein the shifting assembly further includes a lead screw and a rotary actuator.

18. The snowmobile of claim 17, wherein the rotary actuator includes a motor useful for shifting.

19. The snowmobile of claim 1, wherein the upper sprocket assembly to jackshaft torque being less than about ten foot-pounds when the snowmobile is between an incline of about ten degrees and about fifty degrees and the combined weight of the snowmobile and a rider is about seven-hundred-and-fifty pounds.

20. The snowmobile of claim 1, wherein the upper sprocket assembly to jackshaft torque being less than about ten foot-pounds when the snowmobile is between an incline of about ten degrees and about fifty degrees and the combined weight of the snowmobile and a rider is about five-hundred pounds.

21. A snowmobile drive train comprising:
   a reverse sprocket assembly;
   an upper sprocket assembly functionally coupled to the reverse sprocket assembly;
   a lower sprocket assembly functionally coupled to the reverse sprocket assembly, the lower sprocket assembly being functionally coupled to a drive shaft;
   a jackshaft rotatable within the upper sprocket assembly;
   a pinion operatively connected to the jackshaft and selectively positionable axially along the jackshaft to a first position that engages the upper sprocket assembly to translate the snowmobile in a forward direction and to a second position that engages the reverse sprocket assembly to translate the snowmobile in a reverse direction;
   a shifting assembly to selectively position the pinion axially along the jackshaft; and
   a braking assembly functionally coupled to the drive train.

22. The snowmobile drive train of claim 21, wherein the braking assembly is functionally coupled to the upper sprocket assembly.

23. The snowmobile drive train of claim 22, wherein the braking assembly includes a rotor functionally coupled to the upper sprocket assembly.

24. The snowmobile drive train of claim 21, wherein the braking assembly is functionally coupled to the drive shaft.

25. The snowmobile drive train of claim 21, wherein the upper sprocket assembly and the lower sprocket assembly are functionally coupled to the reverse sprocket assembly by a chain.

26. The snowmobile drive train of claim 21, wherein the upper sprocket assembly includes an upper sprocket and an upper hub connected by a spline interface.

27. The snowmobile drive train of claim 21, wherein the lower sprocket assembly includes a lower sprocket and a lower hub connected by a spline interface.

28. The snowmobile drive train of claim 21, wherein the reverse sprocket assembly includes a reverse sprocket and a reverse gear.

29. The snowmobile drive train of claim 21, wherein the shifting assembly includes a spring biased shifting member.

30. The snowmobile drive train of claim 29, wherein the shifting assembly further includes a lead screw and a rotary actuator.

31. The snowmobile drive train of claim 30, wherein the rotary actuator includes a motor useful for shifting.

32. A method of shifting a snowmobile comprising:
providing a snowmobile comprising a drive train operatively connected to an engine, the drive train comprising a reverse sprocket assembly functionally coupled to an upper sprocket assembly and a lower sprocket assembly, a lower sprocket assembly functionally coupled to a drive shaft, a jackshaft rotatable within the upper sprocket assembly, and a pinion operatively connected to the jackshaft; and
selectively positioning the pinion axially along the jackshaft to a first position that engages the upper sprocket assembly to translate the snowmobile in a forward direction or to a second position that engages the reverse sprocket assembly to translate the snowmobile in a reverse direction.

33. The method of claim 32, wherein the reverse sprocket assembly is functionally coupled to the upper sprocket assembly and the lower sprocket assembly by a chain, and the upper sprocket assembly includes an upper sprocket and an upper hub connected by a spline interface, the reverse sprocket assembly includes a reverse sprocket and a reverse gear, and the lower sprocket assembly includes a lower sprocket and a lower hub connected by a spline interface.

34. The method of claim 33, wherein the jackshaft transmits force to the pinion, the pinion transfers the force to the reverse gear, the reverse gear transmits the force to the reverse sprocket, the reverse sprocket transmits the force to the chain, the chain transmits the force to the upper sprocket and the lower sprocket, the upper sprocket transmitting the force to the upper hub which rotates over the jackshaft and the lower sprocket transmitting the force to the lower hub which transmits the force to the drive shaft to translate the snowmobile in a reverse direction.

35. The method of claim 33, wherein the jackshaft transmits force to the pinion, the pinion transmits force to the upper hub, the upper hub transmits force to the upper sprocket, the upper sprocket transmits force to the chain, the chain transmits force to the lower sprocket, the lower sprocket transmits force to the lower hub, and the lower hub transmits the force to the drive shaft to translate the snowmobile in a forward direction.

36. The method of claim 32, further including the step of applying a brake functionally coupled to the upper sprocket assembly, wherein forces between the drive shaft and the brake do not substantially impinge on the jackshaft.

37. The method of claim 32, wherein the pinion is selectively positioned axially along the jackshaft by actuating a shifting assembly including a rotary actuator.

38. The method of claim 37, wherein the rotary actuator is motor driven.

39. The method of claim 32, wherein the combined weight of the snowmobile and a rider is about seven-hundred-and-fifty pounds and the pinion is selectively positioned when the snowmobile is at an incline of about ten degrees, the upper sprocket assembly to jackshaft torque being less than about ten foot-pounds.

40. The method of claim 32, wherein the combined weight of the snowmobile and a rider is about seven-hundred-and-fifty pounds and the pinion is selectively positioned when the snowmobile is at an incline of about fifty degrees, the upper sprocket assembly to jackshaft torque being less than about ten foot-pounds.

41. The method of claim 32, wherein the combined weight of the snowmobile and a rider is about five-hundred pounds and the pinion is selectively positioned when the snowmobile is at an incline of about ten degrees, the upper sprocket assembly to jackshaft torque being less than about ten foot-pounds.

42. The method of claim 32, wherein the combined weight of the snowmobile and a rider is about five-hundred pounds and the pinion is selectively positioned when the snowmobile is at an incline of about fifty degrees, the upper sprocket assembly to jackshaft torque being less than about ten foot-pounds.

* * * * *

UNITED STATES PATENT AND TRADEMARK OFFICE
CERTIFICATE OF CORRECTION

PATENT NO. : 7,617,899 B1  
APPLICATION NO. : 11/027345  
DATED : November 17, 2009  
INVENTOR(S) : Warner et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1354 days.

Signed and Sealed this

Nineteenth Day of October, 2010

David J. Kappos  
*Director of the United States Patent and Trademark Office*